(12) United States Patent
Weber et al.

(10) Patent No.: US 6,820,171 B1
(45) Date of Patent: Nov. 16, 2004

(54) METHODS AND STRUCTURES FOR AN EXTENSIBLE RAID STORAGE ARCHITECTURE

(75) Inventors: Bret S. Weber, Witchita, KS (US); Rodney A. Dekoning, Augusta, GA (US)

(73) Assignee: LSI Logic Corporation, Milpitas, CA (US)

( * ) Notice: Subject to any disclaimer, the term of this patent is extended or adjusted under 35 U.S.C. 154(b) by 410 days.

(21) Appl. No.: 09/607,300

(22) Filed: Jun. 30, 2000

(51) Int. Cl.[7] ............................................. G06F 13/00
(52) U.S. Cl. ...................... 711/114; 711/154; 711/162
(58) Field of Search ............................... 711/114, 154, 711/162, 111, 112; 710/305, 313

(56) References Cited

U.S. PATENT DOCUMENTS

| | | | |
|---|---|---|---|
| 4,173,713 A | | 11/1979 | Giesken et al. |
| 5,394,532 A | * | 2/1995 | Belsan ........................ 711/113 |
| 5,396,596 A | * | 3/1995 | Hashemi et al. ............ 711/113 |
| 5,519,694 A | | 5/1996 | Brewer et al. |
| 5,606,359 A | | 2/1997 | Youden et al. |
| 5,675,579 A | | 10/1997 | Watson et al. |
| 5,694,121 A | | 12/1997 | Krause et al. |
| 5,710,549 A | | 1/1998 | Horst et al. |
| 6,023,780 A | * | 2/2000 | Iwatani .......................... 714/6 |
| 6,148,414 A | * | 11/2000 | Brown et al. .................. 714/11 |
| 6,178,521 B1 | * | 1/2001 | Filgate ........................... 714/6 |
| 6,195,770 B1 | * | 2/2001 | Walton ......................... 710/35 |
| 6,230,221 B1 | * | 5/2001 | Mulvey et al. ............... 710/62 |
| 6,289,401 B1 | * | 9/2001 | Tuccio et al. ............... 361/684 |
| 6,385,681 B1 | * | 5/2002 | Fujimoto et al. ........... 710/316 |
| 6,389,432 B1 | * | 5/2002 | Pothapragada et al. ..... 707/205 |
| 6,389,494 B1 | * | 5/2002 | Walton et al. .............. 710/317 |
| 6,418,511 B1 | * | 7/2002 | Zani et al. .................. 710/107 |
| 6,442,659 B1 | * | 8/2002 | Blumenau ................... 711/162 |
| 6,493,804 B1 | * | 12/2002 | Soltis et al. ................. 711/152 |
| 6,571,310 B1 | * | 5/2003 | Ottesen et al. ................. 711/5 |
| 2002/0035667 A1 | * | 3/2002 | Bruning et al. ............. 711/114 |

OTHER PUBLICATIONS

Hennessy and Patterson, Computer Architecture: A Quantitative Approach, 1996, Morgan Kaufmann Publishers, Inc., second edition, pp. 521–525, 573.*

Authors: Liebhart, Brenner, and Bogaerts. "A Study of an SCI Switch Fabric". IEEE. Modeling, Analysis, and Simulation of Computer and Telecommunication Systems, 1997. pp. 162–169.*

Hennessy and Patterson, Computer Architecture: A Quantitative Approach, 1996, Morgan Kaufmann Publishers, Inc., second edition p. 573.*

Peterson, M.; Storage Area Networking—The Next Network; http://www.sresearch.com/search/105527.htm; Strategic Research Corp.; publication date unknown.

(List continued on next page.)

Primary Examiner—Reba I. Elmore
(74) Attorney, Agent, or Firm—Lathrop & Gage, L.C.

(57) ABSTRACT

A storage subsystem architecture in which front-end (host interface) control is separated from back-end (disk array) control. A plurality of front-end controller devices (FECs) and a plurality of back-end controller devices (BECs) are provided and are interconnected using storage area networking (SAN) switching devices. Each FEC and BEC includes a SAN interface. In a first preferred embodiment, the SAN interface is an InfiniBand compliant communication medium with associated switching and bus components. Alternative embodiments include a SAN interface that is pair of PCI bus interfaces each connected to one of two PCI bus backplanes. In this configuration, the SAN switch is simply the passive PCI backplane. In a second alternative preferred embodiment, redundant pairs of active SAN switch components are provided and each FEC and BEC includes a SAN interface appropriate to the particular SAN switch component selected.

22 Claims, 4 Drawing Sheets

OTHER PUBLICATIONS

Jander, M.; *Launching Storage–Area Net—High–speed storage–area netwroks help net managers hurl stored data around quickly—and take the load off the LAN and WAN*; Data Communications, Mar. 21, 1998; pp. 64–72.

Gibson, G., et al.; *An Introduction to Network–Attached Storage Devices: CMU's Perspective*; http://www.pdl.cd.cmu.edu; Carnegie Mellon—Parallel Data Laboratory; Mar. 5, 1998.

Anderson, D.; *Network Attached Storage Research*; Seagate Technology; PowerPoint presentation; publication date unknown.

Farley, M.; *Avoiding Dead Ends in Storage Networking Through the Use of Storage Routing*; http://www.snla.org/cr.htm; Storage Networking Industry Association; Oct. 16, 1997.

* cited by examiner

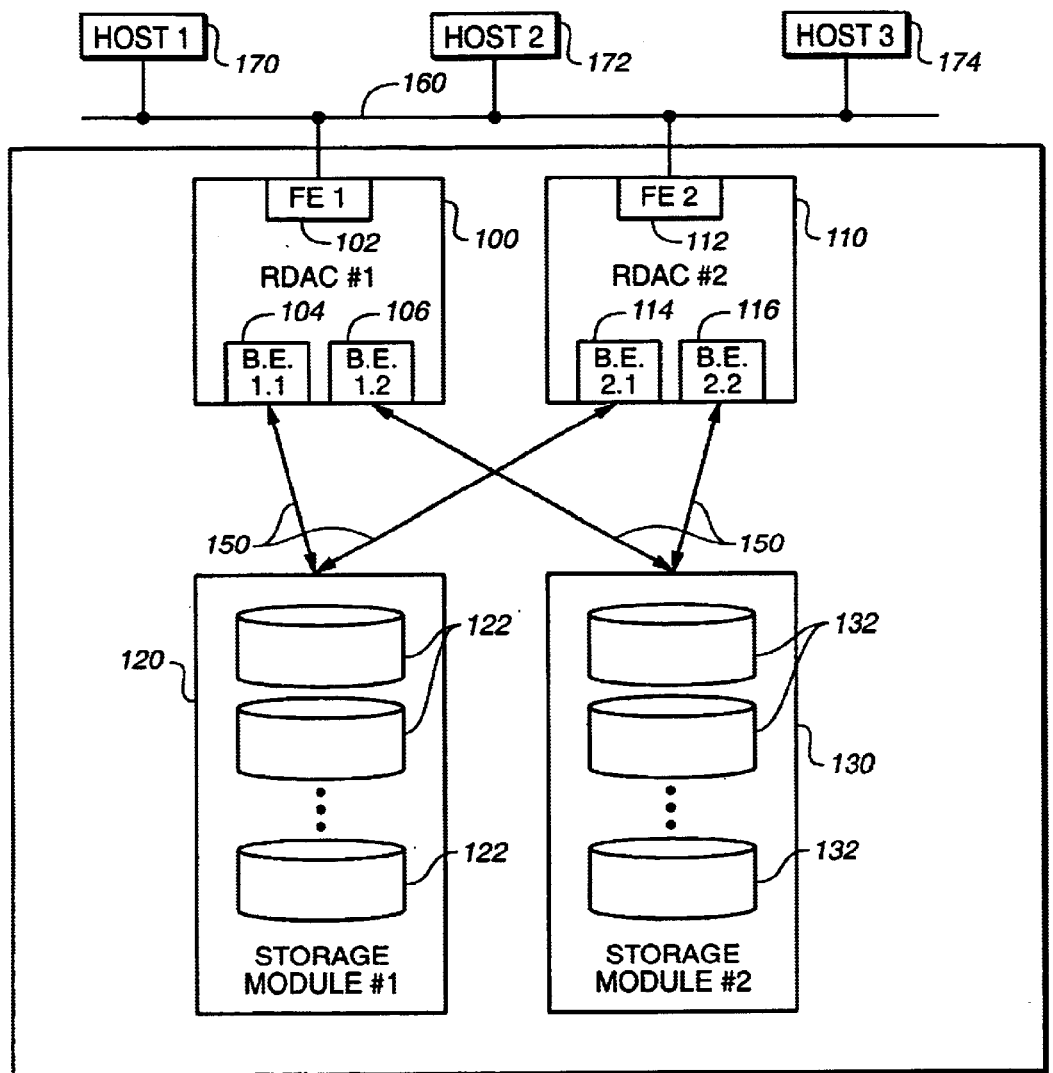
FIG._1
*(PRIOR ART)*

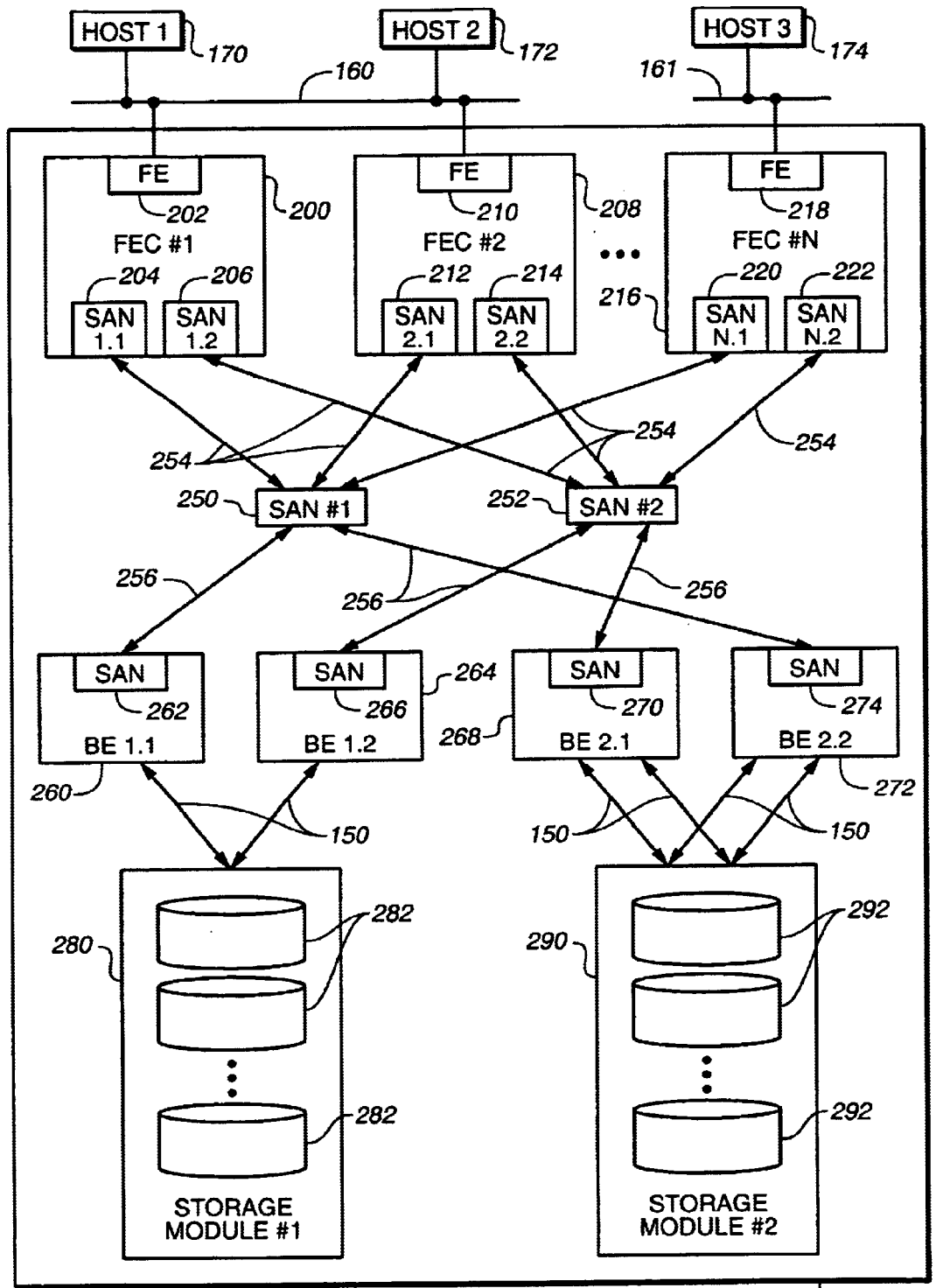
FIG._2

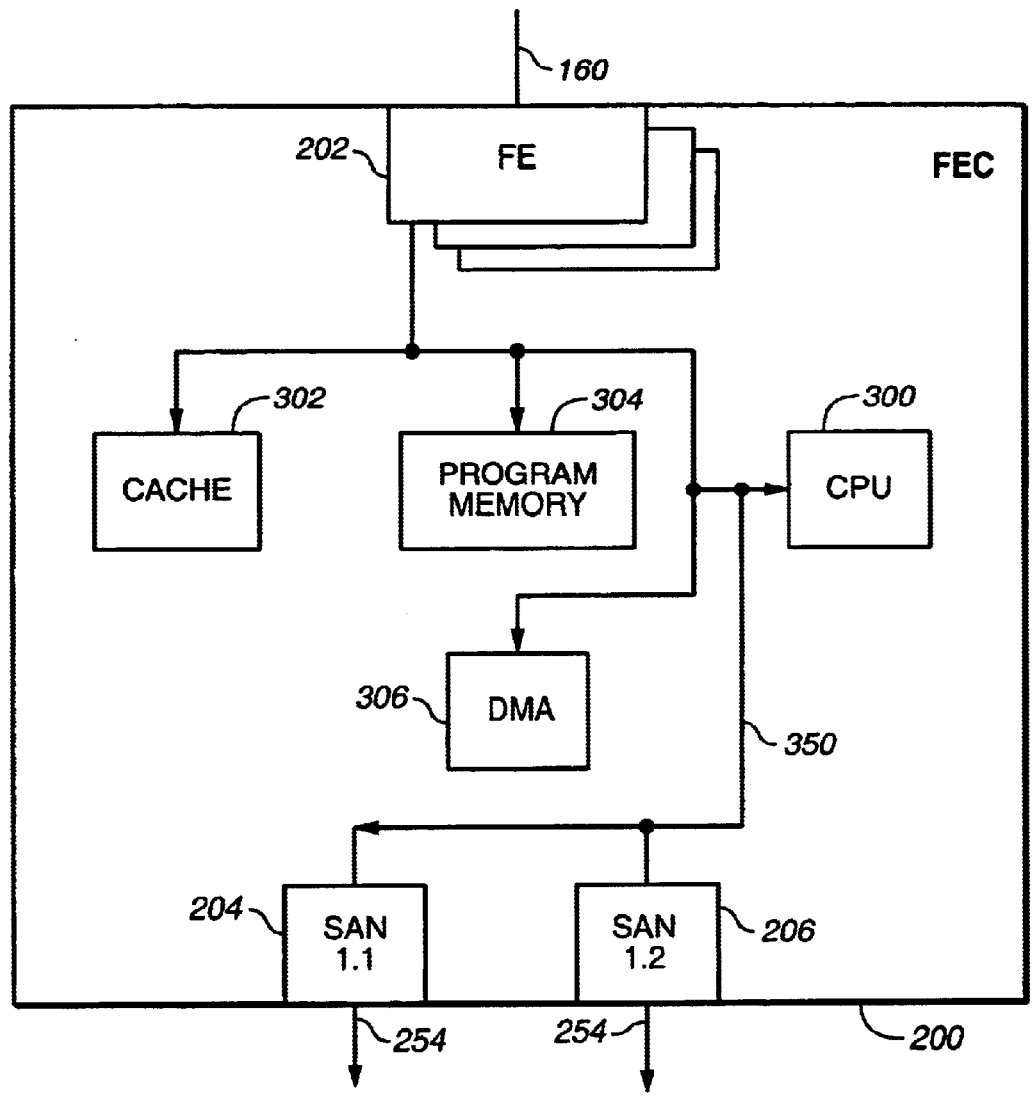
FIG._3

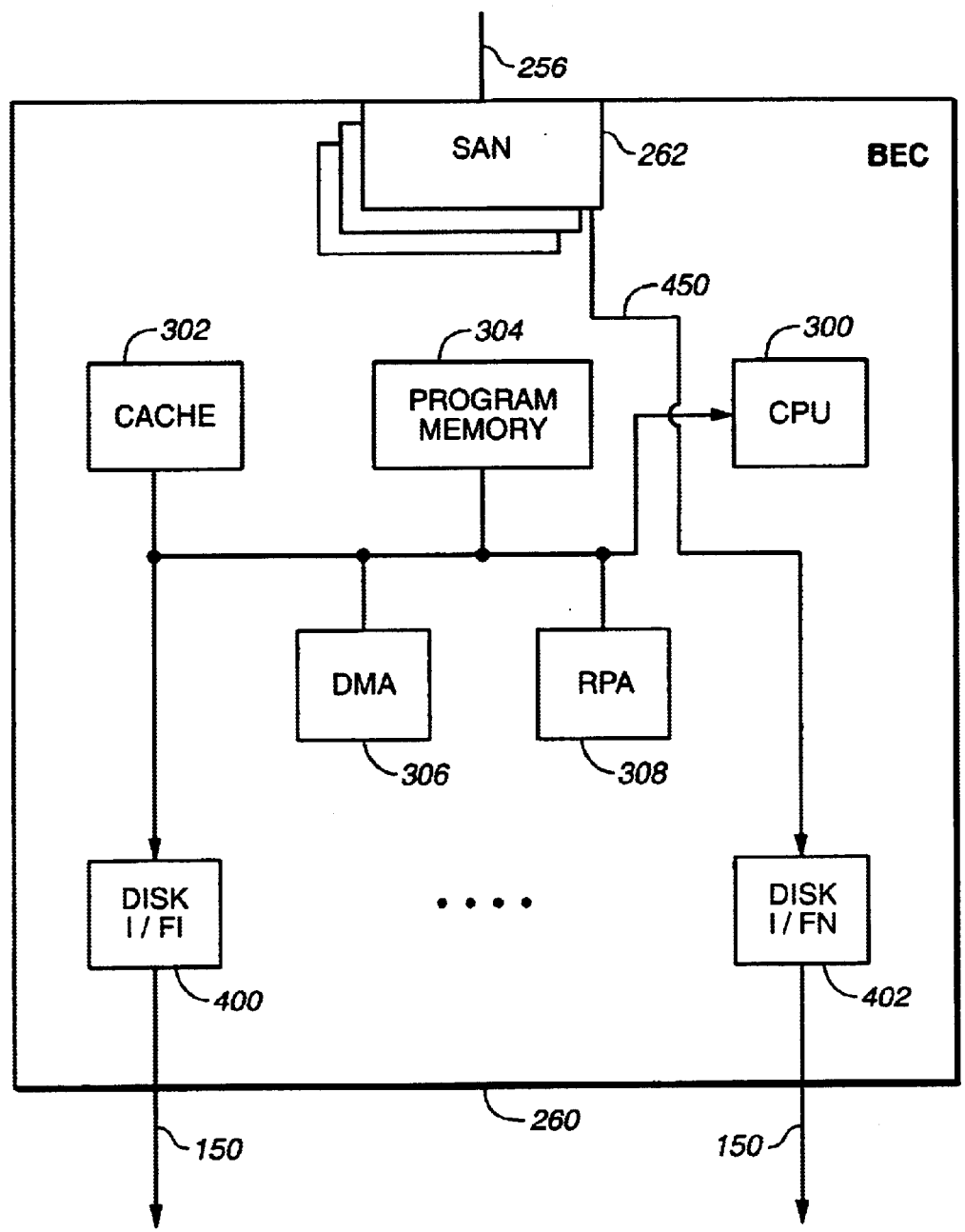
FIG._4

METHODS AND STRUCTURES FOR AN EXTENSIBLE RAID STORAGE ARCHITECTURE

BACKGROUND OF THE INVENTION

1. Field of the Invention

The invention relates to storage subsystem architectures and in particular to a RAID storage subsystem architecture that applies SAN principles and technology to the internal architecture of the storage subsystem.

2. Discussion of Related Art

Computer storage subsystems are evolving at a rapid pace to require, at once, high capacity, high performance and high reliability. Disk drive technology has evolved to enable large capacities in individual disk drives. As applied in storage subsystems with multiple drives to achieve higher total storage capacity, each high capacity disk drive gives rise to performance bottlenecks as well as significant reliability problems. Where, for example, an entire request to store or retrieve data is directed to a single disk drive, the throughput of the storage system will be that of the single disk drive and the reliability of the subsystem will be that of a particular disk drive.

Redundant arrays of inexpensive disks ("RAID") storage systems have addressed these needs by providing redundancy for reliability and management techniques to achieve higher performance. Specifically, RAID subsystems apply various management techniques (often referred to as RAID "levels") to provide redundancy in the storage of data on the disk drives such that failure of a single disk drive does not render the entire subsystem unusable. Other RAID techniques ("striping") distribute the data over multiple disk drives to achieve the benefit of multiple disk drives processing a single larger I/O request to read or write data. Where N disk drives are used to process a single I/O request, the time to complete the request as compared to a single drive is on the order of 1/N.

The "array" of multiple disk drives in a RAID storage subsystem is managed by a RAID storage controller device. The storage controller typically includes a general purpose microprocessor with associated program memory, cache memory for caching data sent to and from the disk drive array, "back-end" interfaces to adapt the controller to the disk drive array (i.e., SCSI and/or Fibre Channel interface controllers), a "front-end" interface to couple the controller to one or more host systems, etc. The storage controller manages the disk array to make the array appear to a host computer as a large single disk drive that offers improved performance and reliability as compared that of a single disk drive.

To further enhance reliability and performance, RAID subsystems also are known to utilize multiple such storage controllers. The multiple storage controllers are often configured and managed to provide redundancy such that failure of a single storage controller does not render the subsystem inaccessible. The multiple controllers may also be configured to enhance performance of the storage subsystem by providing parallel processing by multiple controllers of multiple host system I/O requests. The load of I/O requests may therefore be distributed over the plurality of storage controllers to reduce the total processing time required for a series of I/O requests that may be processed in parallel.

Such multiple controller architectures still suffer from certain performance bottlenecks. For example, it is common that the multiple controllers share a common connection to the disk drives in the disk array. Shared use of the common disk interface can therefore become a performance restriction for multiple controllers in processing multiple I/O requests in parallel. Similarly, the number of I/O connections ("channels") for connecting the multiple controllers to host systems may be a bottleneck.

Addition of disk drives without corresponding addition of communication channels and associated back-end control functionality could easily saturate existing disk channels. However, presently known architectures do not readily lend themselves to addition of disk drive communication channels independent of controllers having integrated front-end and back-end control functions. Present architectures generally require that the maximum anticipated bandwidth requirements of the back-end communication channels be anticipated in the original design and architecture of the storage subsystem. When applied to lower-end applications requiring only a portion of such capacity, the subsystem is "over designed" in that excess bandwidth capacity is unused and therefore wasted and costly.

Some prior architectures called for "N-way" connectivity among the controllers and the disk drives. In other words, any number "N" of controllers shared access to a common set of disk drives via a common, single communication channel. However, such architectures can rapidly saturate the single, shared communication channel when additional disk drives are added to increase storage capacity. Even where multiple communication channels are utilized, the architecture calls for each controller to access each disk drive adding cost and complexity to each of the N controllers.

In general, present high performance RAID storage subsystems suffer from lack of flexibility in configuring the multiple controllers and multiple disk storage devices or modules. It is therefore desirable to improve the flexibility of such configurations to permit easier enhancement of performance and reliability characteristics of a storage subsystem.

SUMMARY OF THE INVENTION

The present invention solves the above and other problems, thereby advancing the state of the useful arts, by providing a storage subsystem architecture that divides the controller function between front-end controllers and back-end controllers and that applies storage area network ("SAN") techniques and devices within the storage subsystem to interconnect the front-end controllers and back-end controllers. SAN components are known and applied outside the storage subsystem for interconnection of such storage subsystems to host computers and other computing subsystems. In the context of this invention, SAN switches are applied within the storage subsystem to permit more flexible configuration of front-end and back-end control devices within the storage subsystem.

A plurality of back-end storage controllers and a plurality of front-end controllers are configured within a storage subsystem interconnected by a SAN switching network that permits broad flexibility in interconnecting the various controllers. The front-end controllers ("FECs") are dedicated to "front-end" interfacing to host computer systems and are devoid of circuits and functions to control the disk array devices. The back-end controllers ("BECs") are dedicated to "back-end" control of the disk arrays and are devoid of circuits and functions to interface directly with the attached host systems. In this architecture, the FECs and BECs are simpler than prior integral controllers that provided both front-end and back-end control functions.

Each FEC and BEC includes a SAN interface to connect to the SAN switches. The SAN switches therefore provide flexible interconnection between virtually any number of front-end controllers and any number of back-end controllers. Such a storage subsystem may thereby be flexibly configured to add additional back-end controllers where required for back-end performance or reliability enhancement and may be configured to add additional front-end controllers when required for front-end performance and reliability.

By providing such configuration flexibility and simpler FEC and BEC devices that segregate their respective functions, the storage subsystem is more scalable than prior known architectures. Additional FECs may be added to alleviate host communication bottlenecks independent of BEC control functions. Conversely, BECs may be added to alleviate disk communication bottlenecks independent of FEC control functions.

BRIEF DESCRIPTION OF THE DRAWINGS

FIG. 1 is a block diagram of a RAID storage subsystem as presently known in the art.

FIG. 2 is a block diagram of an exemplary RAID storage subsystem in accordance with the present invention.

FIG. 3 is a block diagram of a front-end controller of FIG. 2.

FIG. 4 is a block diagram of a back-end controller of FIG. 2.

DETAILED DESCRIPTION OF THE PREFERRED EMBODIMENTS

While the present invention is susceptible to various modifications and alternative forms, specific embodiments thereof have been shown by way of example in the drawings and will herein be described in detail. It should be understood, however, that it is not intended to limit the invention to the particular form disclosed, but on the contrary, the invention is to cover all modifications, equivalents, and alternatives falling within the spirit and scope of the invention as defined by the appended claims.

FIG. 1 is a block diagram of a typical multi-controller RAID storage subsystem 1 as presently practiced in the art. A plurality of storage controllers 100 and 110 (Redundant Dual Access Controllers ("RDACs") #1 and #2) within the subsystem provide both front-end interfacing to hosts 170 . . . 174 via medium 160 and back-end interfacing to a pair of storage modules 120 and 130 via medium 150. The storage modules 120 and 130 each include a plurality of disk drives 122 and 132, respectively. Each storage controller 100 and 110 is coupled to medium 160 via a front end interface element 102 and 112, respectively. Storage controller 120 is coupled to both storage modules 120 and 130 via back-end interfaces 104 and 106, respectively. Storage controller 110 is coupled to both storage modules 120 and 130 via back end interfaces 114 and 116, respectively and through communication media 150.

As is known in the art, the host communication media 160 may be any of several well-known media including: parallel SCSI, Fibre Channel, Ethernet (or other local area network media), etc. Similarly, it is known in the art that the back-end communication media 150 may be any of several well-known media including parallel SCSI, Fibre Channel, ATA, EIDE, etc. Those skilled in the art will recognize that, depending upon the choice of media, elements 150 and 160 may include appropriate switches, hubs and other connectivity devices as required for the particular communication medium.

This exemplary known architecture provides redundant connectivity within the storage subsystem between the storage controllers and the storage modules. As noted above, this known architecture is inflexible in terms of scalability in that the front-end control functions (i.e., performed within 102) are integrated on a single controller along with the back-end control functions (i.e., performed within 104 and 106). If the subsystem has a need for enhancing back-end performance, additional back-end performance in the form of back-end interface elements and functions are coupled with front-end control circuits and functions. Likewise, if additional front-end processing power for host generated I/O requests is required, the additional controllers are integrated with potentially extraneous back-end control circuits and functions. Furthermore, the interconnection of additional controllers with existing storage modules may be cumbersome depending on the type of connections used.

More specifically, the front-end controllers perform processing related to transactions with attached host computer systems and higher level storage management functions while back-end controllers perform processing related to RAID management of the storage devices and lower level controls within the storage subsystem. Each controller therefore addresses different aspects of the overall performance of the storage subsystem. Both front-end and back-end controllers confront problems with available capacity to handle host I/O transactions. The size and frequency of host I/O requests impact the performance requirements of both the front-end controllers and the back-end controllers. Back-end controllers confront problems relating to interfacing with disk drives and the associated communication channels used therefore. In particular, the back-end controller is matched to a communication channel bandwidth associated with a number of disk drives. The configuration of back-end controllers is therefore preferably matched to the performance characteristics of the disk drives attached to it and the associated communication channel bandwidth. A few high performance disk drives can saturate the communication channels used to communicate with back-end controllers. Additional communication bandwidth for disk drives may therefore require additional back-end controllers to accommodate the potential saturation of the disk interface channel. The needs to scale the front-end transaction processing performance and high end storage management is largely distinct from the needs to scale the back-end performance for RAID management and lower level storage management functions. Though not enabled by prior techniques, it is useful to isolate these functions to permit independent scaling of the performance of front-end control functions and independent scaling of the back-end control functions.

FIG. 2 is a block diagram showing the architecture of a storage system 2 in accordance with the present invention wherein the front-end control circuits and functions are separated from the back-end control circuits and functions. As used herein, "front-end" refers principally to the host system interfacing functions. Exemplary of the functions performed by such front-end controllers are higher level I/O request processing such as RAID storage management for redundancy, RAID logical to physical storage mapping, hierarchical storage management, network file protocol support, high level data striping, backup and restore, routing of I/O requests among controllers, and management functions to map storage to data applications. As used herein, "back-end" refers to lower level control functions relating to disk drive interfacing and associated physical I/O operations on the disk drives. Exemplary of such back-end control functions are high availability storage functions (i.e., RAID management), high performance disk interfacing, high bandwidth I/O management, local device management and data management primitives such as data snapshots and data migration.

Caching of data may occur in both front-end and back-end controllers—typically for different purposes and for enhancing performance of different aspects of the storage subsystem. Those skilled in the art will recognize that the definitions herein of high level or front-end functions as compared to lower level of back-end functions are matters of design choice. Other definitions and divisions of functions among the controllers are possible and within the scope of the present invention. Key to the invention is some division of functions between a front-end controller and a back-end controller allowing independent scaling of the controllers.

The two layers (front-end and back-end) communicate via a SAN architecture layer preferably using an intelligent, structured interface protocol. The interface protocol may utilize a custom design protocol because this architecture is internal to the storage subsystem and need not be exposed external to the subsystem. In the alternative, the structured interface protocol may apply industry standards such as $I^2O$ or the Intel Virtual Interface Architecture. Again, such interface protocols and structures issues constitute well known design choices for those skilled in the art.

In particular, storage system 2 includes a plurality of front-end control elements 200, 208 and 216. Each front-end controller includes one or more front-end interface elements (202, 210 and 218, respectively) to connect the front-end control element (FEC) to one or more host systems 170 . . . 174 via a host communication media 160 . . . 161. FECs may be connected to a plurality of host system communication media as required for flexible connectivity to host systems. For example, media 160 and 161 may be separate segments of a common communication media type or may even be different types. As noted above, the communication medium used between FECs and host systems may be any of several well-known types as discussed above.

Each FEC (200, 208, 216) also includes one or more intra-subsystem SAN interfaces (204 and 206, 212 and 214, and 220 and 222, respectively). Intra-subsystem SAN interfaces 204, 206, 212, 214, 220 and 222 are referred to as "intra-subsystem" to distinguish from SAN interfaces that may be used in a storage subsystem to connect to SAN components external to the storage subsystem. Such external SAN interfaces are not relevant to the operation and structure of the present invention. As used herein below "SAN interface" refers to intra-subsystem SAN interfaces as distinct from any SAN interfaces that may be present on a controller for interfacing external to the storage subsystem.

Each FEC includes one or more SAN interface elements connecting the FEC to the SAN switches 250 and 252 via SAN communication media 254. There are preferably at least two SAN switches 250 and 252 to permit such redundant connectivity from the front-end control elements to the plurality of back-end control elements discussed below. There may be any number of such redundant links but in the preferred embodiment, two links from each front-end control element, one to each of two SAN switches, is considered necessary and sufficient. Where reliability of the front-end control communication with the back-end control elements is deemed less important, a single connection between a front-end control element and the SAN switches may be adequate.

Storage system 200 also includes a plurality of back-end control elements 260, 264, 268 and 272 preferably configured as shown in redundant pairs (260 and 264 as a first pair and 268 and 272 as a second pair). Each back-end control element (BEC) includes a SAN interface element (262, 266, 270 and 274, respectively). Each BEC of a redundant pair is connected to one of the two redundant SAN switches 250 and 252 via SAN communication media 256. Specifically as exemplified in FIG. 2, back-end control element 260 (BEC) connects to SAN switch 250 via SAN interface 262. BEG 264 connects to SAN switch 252 via SAN interface 266. BEC 268 connects to SAN switch 252 via SAN interface 270 and lastly, BEC 272 connects to SAN switch 250 via SAN interface 274.

Each BEG connects to a storage module 280 or 290 comprised of a plurality of disk drives 282 and 292, respectively. Each BEC of a redundant pair preferably connects to one of the storage modules. For example, as shown in FIG. 2, BEC 260 connects to storage module 280 via media 150 and BEC 264, the other BEC of the redundant pair of 260 and 264, also connects to storage module 280 via media 150. It is also possible for each BEC to provide a pair of redundant links to its associated storage module. For example, as shown in FIG. 2, redundant pair of BECs 268 and 272 are each redundantly connected to storage module 290 via a redundant pair of communication links in media 150. As noted above, communication media 150 between the BECs and the storage modules may be any over several well-known types as discussed above.

Those skilled in the art will recognize that the specific configuration (topology) shown in FIG. 2 is intended merely as exemplary of one possible embodiment in accordance with the present invention. The present invention provides for the segregation of front-end control functions and back-end control functions into distinct circuits with a SAN architecture interconnecting the elements. A wide variety of alternate configurations and topologies will be recognized by those skilled in the art. Further, the number of FECs, BECs and SAN switches and the grouping of those devices into pairs, is intended merely as exemplary of one preferred embodiment. Any number of FECs, BECs and SAN switches may be configured in a system in accordance with the present invention. In a particular application, the number of such controllers and SAN switches is determined by matching the bandwidth and transaction processing capability of the components with the subsystem requirements for that application. The individual modules and components (FECs, BECs, disk drives, SAN switches, etc.) of the storage subsystem in accordance with the present invention may be dynamically reconfigured by a user to modify performance characteristics to fit changing demands on the storage subsystem.

The present invention expresses the preference for at least pairs of SAN switches and pairs of BECs to ensure redundancy throughout the connections from a host system through to the individual disk drive devices. Any number of FECs, BECs and SAN switches, paired or not, may be configured within the intended scope of the present inventions.

As noted above, the SAN switches (250 and 252) and associated SAN communication media 254 and 256 may apply any of several existing SAN architectures. The SAN switches and associated communication media may be any that allows the passing of data and I/O requests between the FECs and the BECs with low latency (i.e., less than 10 microseconds). Typical of such devices/media are PCI buses, local area network (LAN) connections (i.e., Ethernet or Gigabit Ethernet, etc.), Fibre Channel SAN switch devices and media, InfiniBand (www.infinibandta.org) and ServerNet (developed by Tandem and presently sold by Compaq). The ideal configuration involves a switch that allows for bandwidths that scale with the number of devices (FECs and BECs) that are added to the SAN. Present market forces and technology factors suggest that InfiniBand is a preferred embodiment of the SAN communication media.

FIG. 3 is a block diagram of a typical FEC device in accordance with the present invention. As noted above, the FEC of the present invention is similar to a storage controller as presently known in the art and as shown in FIG. 1 except that it is devoid of back-end control functions and circuits. Rather, the FEC has a redundant SAN interface to permit flexible connectivity to back-end control elements through the SAN layer.

In particular, FEC 200 is shown in additional detail in FIG. 2. FEC 200 is intended as exemplary of all FECs shown in FIG. 2 above. In the preferred embodiment, FECs are not identical devices. As noted above, each FEC may provide a different type of host (front-end) interface to permit added flexibility in the connectivity of the storage system. The different types of host interfaces may include different physical interfaces and protocols or merely different logical interfaces provided on a common physical medium. In addition, different front-end interfaces may provide varying functions for particular connection application. For example, network file protocols may be directly supported in a particular FEC while another FEC may provide only lower level block level access interface functions.

In the preferred embodiment. FEC 200 includes a general purpose CPU 300 that controls overall operation of the FEC and processes I/O requests received from the front-end interface element 202 and received from the back-end devices connected through SAN interfaces 204 and 206. Programmed instructions and data for operation of CPU 300 are stored in program memory 304. Data sent to or from the host systems or the BECs is cached in cache memory 302 to improve controller performance. DMA 306 assists CPU 300 in transferring data among the various components. All components communicate via processor bus 350.

Those skilled in the art will recognize that the block diagram of FIG. 3 is intended merely as exemplary or suggestive of the design of an FEC. The specific compliment of components associated with the CPU and the specific bus or buses that interconnect those components is a matter of design choice well-known to those skilled in the art. For example, a front-end controller may optionally include RAID parity assist (RPA) computation devices for other higher level RAID management support in the FEC. Key to the FEC design shown in FIG. 3 is that the FEC is devoid of back-end disk drive interface components. Rather, that function is segregated onto a back-end controller element. The FEC therefore preferably performs necessary mapping of logical storage addresses (supplied by host I/O requests) into physical storage locations conveyed to appropriate BECs to perform the host requested I/O operation. The SAN interfaces 204 and 206 permit flexible interconnection of the FEC with a number of BEC elements via the SAN intermediate layer. Further, as noted above, intelligent I/O interfacing protocols and APIs are preferably implemented within the FEC and BEC to permit a structured, standardized interface between the layers through the SAN switch intermediate communication layer.

FIG. 4 is a block diagram of an exemplary back-end control element 260 (BEC) in accordance with the present invention. BEC 260 is representative of all BEC elements shown above in FIG. 2. BECs are preferably identical in design, though as noted they may vary in accordance with specific needs of a particular storage system application. For example, different BECs within a storage system may each provide a different back-end interface medium to connect to a set of disk drives. A first BEC in a storage system may use parallel SCSI for example to connect to a storage module while a second BEC in the same storage system may use Fibre Channel to connect to a storage module. Similarly, a first BEC may provide a single connection to a storage module while another BEC in the same system may provide redundant links to another or the same storage module. Or, for example, groups of BECs may be tuned for different performance characteristics. Some BECs may be tuned to high bandwidth back-end performance requirements while others could be tuned high I/O transaction rate requirements. Still other BECs may be tuned for tape storage as distinct from disk storage. Such flexible configurations are useful in hierarchical storage management applications where a multitude of storage media are incorporated into a single storage subsystem each medium having different access and performance characteristics.

As above, the BEC performs the lower level functions of interfacing with the disk drives directly. Lower level physical I/O operations are performed by the BEC. As noted above, a key to the architecture of the BEC of the present invention is that it is devoid of functions and associated circuits for performing host interfacing (front-end interfacing). Otherwise, BECs are substantially similar to the general structure of FECs. Programmed instructions and data for operation of CPU 300 are stored in program memory 304. Data sent to or from the disk drives or the FECs is cached in cache memory 302 to improve controller performance. DMA 306 assists CPU 300 in transferring data among the various components. As noted above, RAID storage management functions are preferably performed within BEC 260. RPA 308 (RAID Parity Assist) aids CPU 300 in rapidly computing parity values for RAID storage management functions within the BEC. All components communicate via processor bus 450.

In particular, BEC 260 includes one or more SAN interfaces 262 to connect to the SAN communication media 256. The SAN interfaces 262 are coupled via bus 450 to disk interfaces 400 and 402 which, in turn, are coupled via bus 150 to storage modules and/or individual disk drives. As shown in FIG. 4, disk interfaces 400 and 402 include all intelligence required to interface with a front-end control element via bus 450 and SAN interface 262. Those skilled in the art will recognize that in particular applications it may be beneficial to implement the FEC and BEC as identical hardware components each implementing its particular designated function. Such identity of the hardware components permits more flexible replacement of spare parts in the subsystem. Further, those skilled in the art will recognize that many of the components in an FEC or BEC may be integrated into higher level integrated circuits incorporating many discrete functions into a VLSI custom circuit. Such design choices are well-known to those skilled in the art. Key to the BEC of the present invention is that it is devoid of front-end functions and associated circuits. Rather, it performs only the back-end functions of low level disk drive command processing. Interfacing with higher level front-end control elements is provided via the SAN interfaces of the BEC.

The present invention as described above provides a key benefit in that the architecture can be flexibly scaled to different bandwidth requirements unique to particular applications. As back-end performance becomes a bottleneck, additional BECs may be easily integrated. Likewise, as front-end I/O processing performance becomes a bottleneck in system throughput, additional FECs may be added to improve I/O processing performance. Further, as new or additional host interface channels or protocols are required, additional FECs having different host channel interfaces and/or protocols may be added. The architecture of the present invention therefore improves flexibility and scalability of the storage subsystem to allow customization and adaptation to particular needs of particular applications.

While the invention has been illustrated and described in detail in the drawings and foregoing description, such illustration and description is to be considered as exemplary and not restrictive in character, it being understood that only the preferred embodiment and minor variants thereof have been shown and described and that all changes and modifications that come within the spirit of the invention are desired to be protected.

What is claimed is:

1. A storage system comprising:
    a plurality of front-end control elements devoid of circuits and functions that control a plurality of I/O devices and configured for controlling information exchange using RAID storage management with one or more attached host computer systems;
    a plurality of back-end control elements devoid of circuits and functions that interface directly with the attached host computer systems, communicatively coupled to a plurality of I/O devices and configured for controlling information exchange with the I/O devices, wherein the front-end control elements differ in number from the back-end control elements; and
    an interconnect element coupled to said front-end control elements and coupled to said back-end control elements to enable exchange of information therebetween, wherein the storage system is adapted to implement additional front-end control elements, back-end control elements and interconnect elements independent of all other such elements wherein the interconnect element is configured for conveying the requests from the front-end control elements to the back-end control elements to perform the host requested I/O operation, and wherein said interconnect element is an SAN architecture fabric that conveys the requests from the front-end control elements to the back-end control elements by exchange of messages between the front-end and back-end control elements according to address indicia within the messages and associated with the front-end and back-end control elements.

2. The system of claim 1 further comprising:
    a plurality of disk drives coupled as I/O devices to said back-end control elements.

3. The system of claim 2 wherein said plurality of disk drives comprises:
    a first subset of said plurality of disk drives; and
    a second subset of said plurality of disk drives, and
    wherein said plurality of back-end control elements includes:
    a first pair of back-e nd controllers coupled to said first subset; and
    a second pair of back-end controllers coupled to said second subset.

4. The system of claim 3 further comprising:
    a first pair of redundant links coupling said first pair of back-end controllers to said first subset; and
    a second pair of redundant links coupling said second pair of back-end controllers to said second subset.

5. The system of claim 1 wherein said interconnect element comprises a pair of interconnect elements and wherein each of said plurality of front-end control elements is coupled to each of said pair of interconnect elements.

6. The system of claim 5 further comprising:
    a first set of disk drives; and
    a second set of disk drives, said plurality of back-end control elements including:
    a first pair of back-end controllers coupled to said first set wherein each of said first pair of back-end controllers is coupled to a corresponding one of said pair of interconnect elements; and
    a second pair of back-end controllers coupled to said second set wherein each of said second pair of back-end controllers is coupled to a corresponding one of said pair of interconnect elements.

7. The system of claim 1 wherein said interconnect element comprises a PCI bus.

8. The system of claim 1 wherein said interconnect element comprises:
    a Fibre Channel communication medium; and
    a Fibre Channel SAN switch coupled to said Fibre Channel communication medium.

9. The system of claim 1 wherein said interconnect element comprises an InfiniBand compliant communication medium.

10. The system of claim 1 wherein said interconnect element comprises a local area network communication medium.

11. The system of claim 1 wherein said front-end control element is operable to perform mapping of logical storage addresses to physical storage addresses for further operations by said back-end control element.

12. The system of claim 1 wherein said back-end control further comprises:
    a RAID parity assist element for RAID parity generation and checking.

13. A front-end control element for a storage subsystem comprising:
    a host system interface;
    a processor coupled to said host system interface to process host system generated I/O requests received through said host system interface; and
    an SAN interface coupled to said processor for coupling said front-end control element to a plurality of back-end control elements, wherein said front-end control element is adapted to be added to the storage subsystem independent of said back-end control elements,
    wherein front-end control elements differ in number from said back-end control elements, and
    wherein said SAN interface couples the front-end control element to an SAN fabric that conveys the I/O requests from the front-end control elements to the back-end control elements by exchange of messages between the front-end and back-end control elements according to address indicia within the messages and associated with the front-end and back-end control elements, and
    wherein the front-end control element is devoid of circuits and functions that control a plurality of I/O devices.

14. The front-end control element of claim 13 wherein said SAN interface comprises a PCI bus interface.

15. The front-end control element of claim 13 wherein said SAN interface comprises a Fibre Channel communication media interface.

16. The front-end control element of claim 13 wherein said SAN interface comprises an InfiniBand compliant communication medium.

17. The front-end control element 13 wherein said SAN interface comprises a local area network communication medium.

18. A back-end control element for a storage subsystem comprising:

a disk drive interface for coupling said back-end control element to a plurality of disk drives; and an SAN interface coupled to said disk drive interface for coupling said back-end control element to a plurality of front-end control elements, wherein said back-end control element is adapted to be added to the storage subsystem independent of said front-end control elements, wherein back-end control elements differ in number from said front-end control elements, and wherein said SAN interface couples the back-end control element to an SAN fabric that conveys the I/O requests from the front-end control elements to the back-end control element by exchange of messages between the front-end and back-end control elements according to address indicia within the messages and associated with the front-end and back-end control elements, and wherein the back-end control element is devoid of circuits and functions that interface directly with the attached host computer systems.

19. The back-end control element of claim 18 wherein said SAN interface comprises a PCI bus interface.

20. The back-end control element of claim 18 wherein said SAN interface comprises a Fibre Channel communication media interface.

21. The back-end control element of claim 18 wherein said SAN interface comprises an InfiniBand compliant communication medium.

22. The back-end control element of claim 18 wherein said SAN interface comprises a local area network communication medium.

* * * * *